United States Patent [19]

Conley et al.

[11] Patent Number: 4,656,074
[45] Date of Patent: Apr. 7, 1987

[54] EXTRUDED CLOSED CELL THERMOPLASTIC FOAM

[75] Inventors: Kenneth E. Conley, Matthews, N.C.; Thomas E. Stull, Resaca, Ga.

[73] Assignee: Collins & Aikman Corporation, New York, N.Y.

[21] Appl. No.: 721,203

[22] Filed: Apr. 9, 1985

[51] Int. Cl.$^4$ ................................................ B32B 3/02
[52] U.S. Cl. ........................................ 428/95; 264/54; 264/DIG. 18; 428/85; 521/81; 521/134; 521/137; 521/139; 521/143; 521/79
[58] Field of Search .............. 521/134, 81, 139, 137, 521/143; 428/85, 95; 264/54, DIG. 18

[56] References Cited

U.S. PATENT DOCUMENTS

| | | | |
|---|---|---|---|
| 3,651,183 | 3/1972 | Hosoda et al. | 521/96 |
| 3,812,225 | 5/1974 | Hosoda et al. | 521/95 |
| 3,819,543 | 6/1974 | Stastny et al. | 521/60 |
| 4,146,598 | 3/1979 | Coyne | 521/90 |
| 4,209,473 | 6/1980 | Coyne | 521/90 |
| 4,220,730 | 9/1980 | Coyne | 521/90 |
| 4,384,049 | 5/1983 | Rametsteiner | 521/134 |

Primary Examiner—Morton Foelak
Attorney, Agent, or Firm—Bell, Seltzer, Park & Gibson

[57] ABSTRACT

Useful resilient extruded closed cell foam compositions are produced by the present invention by forming an extrudable blend comprising a heat activatible chemical blowing agent and a polymer component consisting essentially of chlorinated polyethylene and at least one other thermoplastic polymer. The amount of chlorinated polyethylene is from 0.025 to 0.5 parts per part of the thermoplastic polymer. The blend is extruded at a temperature below the activation temperature of the blowing agent to form an unfoamed thermoplastic sheet, and the sheet is thereafter heated to a temperature sufficient to activate the blowing agent and expand the sheet and produce a non-crosslinked closed cell thermoplastic foam.

10 Claims, 4 Drawing Figures

EXTRUDED CLOSED CELL THERMOPLASTIC FOAM

FIELD AND BACKGROUND OF THE INVENTION

This invention relates to a thermoplastic foam and method of production, and more particularly to an extruded resilient closed cell thermoplastic foam which is useful as a cushioning material in applications such as a carpet underlay, attached foam carpet backing, floor mats, carpet tiles, etc.

It is well known to produce resilient pads or cushions, such as foam carpet backings, carpet pads and the like, from sponge rubber, frothed rubber latex compositions, polyurethane foams, or from vinyl compositions, such as vinyl chloride plastisols. However, these known compositions have properties which limit their suitability for many applications. Vinyl compositions, for example, contain plasticizers, which may migrate out over a period of time. Additionally, many of these known compositions have poor smoke properties. Also, the foam compositions may be water absorbent, especially those which are of an open cell foam construction such as latex foams or polyurethane foams.

SUMMARY OF THE INVENTION

The present invention provides a foam composition and method of production which has significant advantages over the aforementioned types of resilient foams heretofore used in cushioning applications. The foam of the present invention is an extruded chemically post-blown resilient non-crosslinked closed cell thermoplastic foam comprised of a blend of chlorinated polyethylene and at least one other thermoplastic polymer. Suitable thermoplastic polymers include olefinic polymers, styrenic polymers, polyamides, thermoplastic urethanes, etc.

The thermoplastic foam composition is characterized by having significantly lower smoke properties than vinyl foam compositions. The foam is of a uniform size closed cell structure which renders it non-water absorbent and therefore useful in applications where it may be exposed to water or moisture. The foam also exhibits excellent conformability and cold flow properties, such that it will readily conform to irregularities on the floor or the like. The foam composition is produced by extrusion from a thermoplastic extruder, and may thus be produced economically and rapidly in indefinite length and wide widths, and the final thickness of the foam can be controlled as desired.

It is known that thermoplastic polymers, such as styrenic polymers, olefinic polymers, polyamides, etc. can be extruded. It is also possible to incorporate chemical blowing agents into certain of these polymers and to cause them to foam and expand after extrusion. However, the relatively high extrusion temperatures required by these polymers may activate the blowing agent prematurely while still in the extruder, and the resulting foams typically have a relatively low degree of foaming or expansion and poor, non-uniform cell structure. Additionally, they are relatively rigid and do not exhibit the resiliency and compression set properties required in a cushioning material. Those polymers which can be chemically foamed generally require crosslinking in order to have acceptable properties.

It has also been proposed in the past to produce chlorinated polyethylene foams with the use of a thermally activatable chemical blowing agent, as described for example in U.S. Pat. Nos. 3,498,934, 4,209,473, 4,211,853, and 4,220,730. However, these patents clearly teach that in order to have acceptable properties, the chlorinated polyethylene foam must be crosslinked, typically either by irradiation or by incorporation of a chemical crosslinking agent. The necessity of crosslinking increases the expense of producing such foams and adds additional critical processing parameters which must be carefully controlled in order to produce the foam. The technology for producing chlorinated polyethylene foam has not reached the point that such foams can be successfully produced on a production basis, and presumably this is at least partially due to the aforementioned problems.

In accordance with the present invention a method is provided for obtaining a resilient closed cell thermoplastic foam which can be produced without crosslinking. The method comprises forming an extrudable blend comprising a heat activatable chemical blowing agent and a polymer component consisting essentially of chlorinated polyethylene and at least one other thermoplastic polymer, the amount of said chlorinated polyethylene, by weight, being from 0.025 to 0.5 parts per part of said thermoplastic polymer; extruding the blend from a die without significant activation of the blowing agent by maintaining the extrusion temperature of the foam below the activation temperature of the blowing agent to form an unfoamed thermoplastic sheet, and thereafter foaming the extruded unfoamed sheet by heating the sheet to a temperature sufficient to decompose the blowing agent and expand the sheet.

Although the thermoplastic polymer by itself may have an extrusion temperature greater than the activation temperature of the blowing agent, the extrudable blend of the thermoplastic polymer and chlorinated polyethylene in the proportions indicated is readily extrudable at temperatures below that at which any significant activation of the blowing agent occurs, and produces a thermoplastic sheet with excellent properties which can be post-blown by heating to produce a non-crosslinked closed cell thermoplastic foam of uniform size cell structure. Since the foam composition does not require crosslinking, it remains thermoplastic and may be embossed or thermally formed into various shapes and configurations. This is not possible with crosslinked foams.

The closed cell thermoplastic foam of the present invention is particularly suited for use as a cushioning material, such as a foam carpet backing, carpet underlay, or cushion or mat. Thus in accordance with a further aspect of the invention, there is provided a foam backed carpet article which comprises a pile layer including a backing and pile yarns secured to the backing and extending from one side thereof to form a pile surface, and a resilient foam underlay secured to the opposite side of the backing, said foam underlay comprising an extruded chemically blown closed cell foam comprising a blend of chlorinated polyethylene and a copolymer of ethylene with a monomer selected from the group consisting of vinyl acetate and methyl acrylate, the amount of chlorinated polyethylene, by weight, being from 0.025 to 0.5 parts per part of said ethylene copolymer.

BRIEF DESCRIPTION OF THE DRAWINGS

Further features and advantages of the invention will become apparent from the detailed description which follows, when taken in connection with the accompanying drawings, in which.

DETAILED DESCRIPTION

Figure 1:
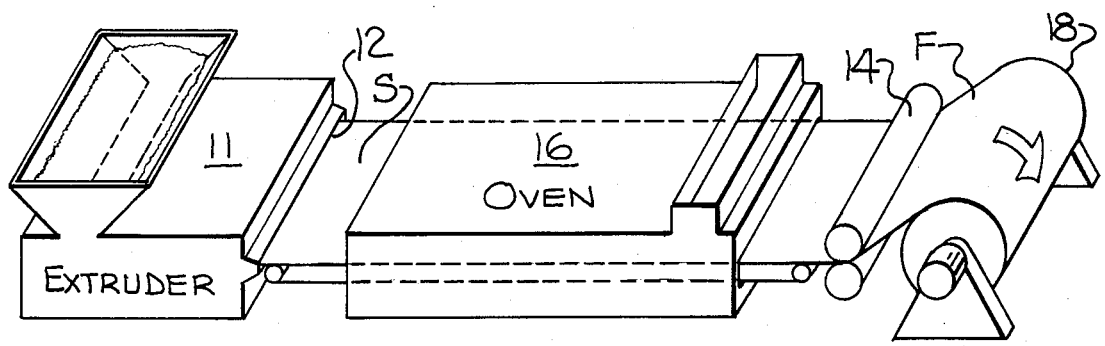
FIG. 1 is a schematic illustration of an arrangement of apparatus used for producing the resilient closed cell thermoplastic foam in accordance with the method of the present invention.

Referring now more particularly to the drawings, FIG. 1 schematically illustrates an arrangement of apparatus for producing an extruded closed cell thermoplastic foam in accordance with the present invention. As illustrated, a thermoplastic polymeric composition is processed through an extruder 11 where it is heated to an extrudable fluid state and extruded from an elongate slot die 12 to form an unfoamed sheet S of the thermoplastic composition. The sheet can be rolled up and foamed at a later time, or as illustrated it may be directly advanced on a continuous releasable carrier through a heat source operating at a temperature sufficiently high to activate or decompose the thermally activatible blowing agent contained in the polymer composition. The heat source may be an oven 16, as illustrated, which may be suitably heated by infrared heater elements, by convection or by other suitable means. Other suitable heat sources may include a hot oil bath, hot salt bath, dielectric heater, etc. Upon heating to a temperature sufficient to activate the blowing agent, the thermoplastic sheet foams and expands in thickness. The expanded thermoplastic foam, indicated by the reference character F, is removed from the carrier and taken up on suitable take-up means such as a roll 18. Optionally, after leaving the oven, the expanded foam sheet F may be passed between a pair of cooperating rolls 14 which are mounted in a predetermined spaced apart relation to one another. In this manner, the overall thickness of the foam sheet can be controlled to within fairly close limits, and the rolls also serve to assist in smoothing the surfaces of the sheet.

Figure 2:
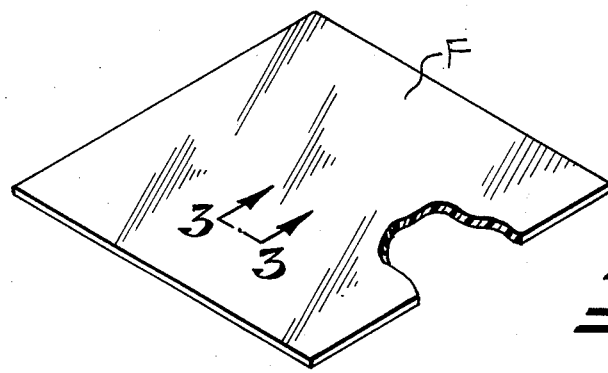
FIGS. 2 and 3 are a perspective view of a sheet of the closed cell foam.
Figure 3:
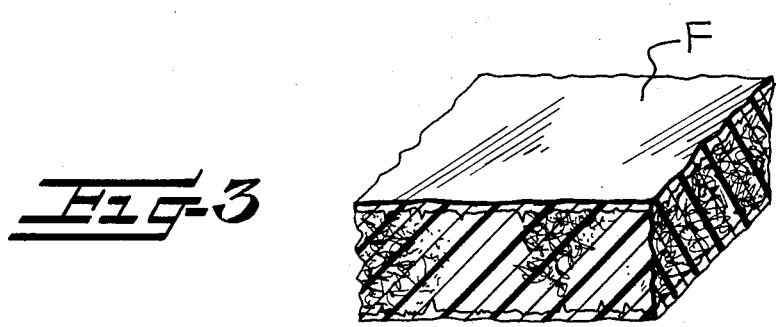
Figure 4:
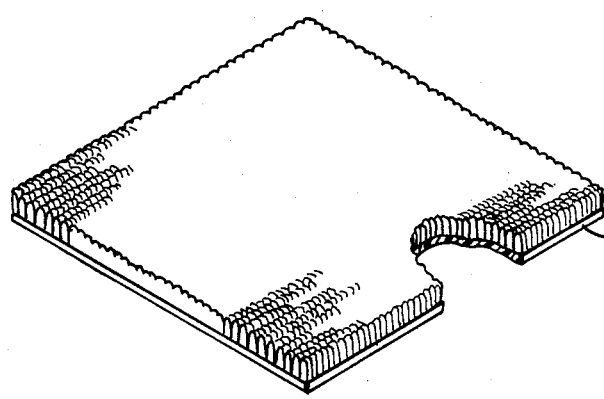
FIG. 4 is a perspective view of a foam backed carpet article having a foam backing formed of the closed cell thermoplastic foam of this invention.

FIG. 2 illustrates a sheet of the extruded closed cell thermoplastic foam in accordance with the present invention. As seen in greater detail in FIG. 3, the foam is characterized by having a multiplicity of relatively fine uniform closed cells, with the opposing surfaces of the foam having an integrally formed substantially impermeable skin. The foams may have a density of from 2 to 60 pounds per cubic foot.

A particularly advantageous property of the foam composition of the present invention is its resiliency. The foam does not take a permanent compression set at ambient temperature. For example, after compressing the foam under a relatively high compressive force (e.g. 100 psi) there will be a noticeable reduction in thickness upon removing the compressive force. However, the foam will substantially recover within about 6 hours and after 24 hours it will have recovered to its full initial thickness. Many commercially available foam compositions will have a permanent compression set under these conditions and will never recover to the full original thickness.

The softness (i.e. resistance to compression) of the foam may be controlled to make the foam useful as a cushioning material in numerous applications, such as a carpet underlay, attached foam carpet backing, mats, pads, and cushions.

The foam is produced by heating an extrudable blend to extrusion temperatures in a thermoplastics extruder and then extruding the composition from a die to foam a sheet. It is important that the temperature and shear conditions within the extruder be carefully controlled so as to avoid prematurely activating the chemical blowing agent. Ideally, the temperature within the extruder should be maintained below the temperature at which a significant portion of the blowing agent will decompose to form a gas, and the geometry and speed of the screws within the extruder should be such as to avoid excessive working and heating of the thermoplastic polymer composition.

The chlorinated polyethylene used in the extrudable thermoplastic foam composition of this invention provides rubbery, elastomeric properties to the foam which contribute to its excellent softness and resiliency, and also allows for lower extrusion temperatures. Chlorinated polyethylene resins suitable for use in the present invention typically have a chlorine content ranging from about 25 to about 50% by weight and a melt index (ASTM-D-1238) of 1 to 12 g./10 min. Chlorinated polyethylene resins are produced and sold commercially by the Dow Chemical Company, Midland, Mich.

The thermoplastic polymer or polymers which are used in the foam composition of this invention typically have an extrusion temperature higher than that of the chlorinated polyethylene and significantly higher than the temperature at which the chemical blowing agent begins to decompose. By themselves, these resins do not have softness, resiliency and foaming properties which would make them suitable as a cushioning material. However, it has been found in accordance with the present invention that when chlorinated polyethylene is blended with the thermoplastic polymer at a rate of about 0.025 to 0.5 parts of chlorinated polyethylene per part of said thermoplastic polymer, and with a chemical blowing agent, the composition can be extruded at significantly reduced temperatures so that premature activation of the blowing agent does not occur. The resulting product has excellent post-foaming characteristics and superior physical properties for use as a cushioning material. Unlike foams formed solely from chlorinated polyethylene, the foams of the present invention do not require crosslinking and can thus be produced without the necessity of expensive irradiation equipment or difficult to handle crosslinking agents such as peroxides. Since they remain thermoplastic and non-crosslinked, they may be embossed or thermally formed into various shapes. The foam compositions take embossing much better than many of the known thermoplastic compositions. Few if any of the known foam compositions lend themselves for embossing.

The proper blend of chlorinated polyethylene and thermoplastic polymer is important in achieving acceptable physical properties. At less than about 0.025 parts chlorinated polyethylene per part of the other thermoplastic polymer the product is undesirably stiff and non-resilient. Above about 0.5 parts CPE per part of ethylene copolymer produces a foam with unacceptable compression set and compression resistance and very little degree of foaming. The optimum blend is about 0.20 to 0.25 parts CPE per part of thermoplastic polymer by weight.

Various thermoplastic polymers may be suitably used with the chlorinated polyethylene in the present invention, including polyurethanes, olefinic polymers, polyamides, styrenic polymers, etc. Preferred foam compositions employ a thermoplastic polymer selected from the group consisting of styrenic and olefinic polymers. Examples of suitable styrenic polymers include styrene and styrene copolymers such as ABS, styrene-acrylonitrile copolymers, styrene rubber copolymer. Examples of suitable olefinic polymers include ethylene polymers and copolymers, for example polyethylene or copolymers of ethylene with at least one ethylenically unsaturated monomer. Especially suitable for use in the present invention are copolymers of ethylene with at least one monomer selected from the group consisting of vinyl acetate and methyl acrylate.

EMA (ethylene-methyl acrylate) resins suitable for use in the present invention preferably have a methyl acrylate content of from 10 to 40 percent, and most desirably about 18 to 28 percent. Suitable EMA resins are commercially available from Gulf Plastics Division of Gulf Oil Corporation. EVA (ethylene vinyl acetate) resins suitable for use in the present invention typically have a vinyl acetate content of from 10 to 50 percent, and most desirably about 17 to 30 percent. Examples of commercially available ethylene vinyl acetate resins include the Elvax series of resins available from DuPont Company (e.g. Elvax 420, 460 and 265) and the UE series of EVA resins from USI of Champaign, Ill.

In order to achieve foaming of the extruded thermoplastic composition, the thermoplastic resins are blended with a heat activatable chemical blowing agent, preferably at a rate of about 0.1 to 15% by weight depending upon the particular blowing agent, desired density and other properties. Any heat activatable blowing agent conventionally used in the production of thermoplastic foams and which activates above the extrusion temperature of the resin blend may be used in the present invention. Examples of suitable heat decomposable chemical blowing agents include azodicarbonamides, modified azodicarbonamides, aliphatic sulfonyl semicarbazides, and hydrazides.

The composition may also include suitable stabilizers for the chlorinated polyethylene, as is conventional with the extrusion of CPE resins. Examples of such stabilizers are single metal stabilizers such as lead, barium or calcium salts of fatty acids; and mixed metal stabilizers such as barium-calcium, barium-tin, barium-calcium. The stabilizers also assist in achieving a good high degree of foaming. The composition may also include other conventional additives such as flame retardants including antimony trioxide and aluminum trihydrate, die lubricants, pigments, extenders such as oils or paraffins, uv stabilizers, bacteriocides, fungicides, etc. The composition may also include inorganic particulate filler materials such as calcium carbonate, barium sulfate, silicates, metallic oxides such as titanium dioxide, carbon black, etc.

EXAMPLE 1

Three foam formulations according to Table I below were prepared and were extruded through a slot die on a Werner Phleiterer twin screw extruder under the controlled conditions set forth in Table I to produce unfoamed thermoplastic sheets approximately ⅛ inch in thickness. The sheets were thereafter heated in an oven to expand the sheets and produce a non-crosslinked closed cell thermoplastic foam. Sample 2 gave a uniform blow of about 250%. The foam was tough, flexible, resilient and had a density of approximately 18 lbs. per cubic foot and a fine uniform cell size similar to vinyl foam. Samples 1 and 3 were blown to a somewhat lesser extent, but exhibited excellent softness, resiliency and uniform cell size.

TABLE I

| Sample | | 1 | 2 | 3 |
|---|---|---|---|---|
| FORMULATIONS | | | | |
| EMA (Gulf EMA 2205) | | — | 80 | — |
| EVA USI-UE 621 | | 80 | — | — |
| EVA copolymer 18% VA (Elvax 460) | | — | — | 40 |
| EVA copolymer 25% VA (Elvax 360) | | — | — | 40 |
| Chlorinated Polyethylene (Dow CPE 3611) | | 17.6 | 17.6 | 17.6 |
| Lead Sterate | | .4 | .4 | .4 |
| Celegen AZ | | 2 | 2 | 2 |
| CONDITIONS | | | | |
| Barrel Zone °C. | 1 | 180 | 180 | 180 |
| | 2 | 150 | 150 | 150 |
| | 3 | 135 | 135 | 135 |
| | 4 | 151 | 151 | 151 |
| | 5 | 155 | 155 | 155 |
| Die Zone Temp. °F. | 1 | *300–280 | 260 | 250 |
| | 2 | 300–280 | 260 | 250 |
| | 3 | 300–280 | 260 | 250 |
| | RPM | 100 | 100 | 100 |
| | % Torque | 70 | 75 | 70 |
| | Melt Temp. °F. | 260 | 240 | 240 |
| | Output lbs/hr | 200 | 200 | 200 |
| | Oven Temp. °F. | 390 | 380 | 400 |

*Die temperature brought down from 300 to 280° F. during run.

EXAMPLE 2

Several foams in accordance with the invention were prepared by blending chlorinated polyethylene with different commercially available thermoplastic resins and extruding and foaming as in Example 1. The formulations and results are presented in Table II.

TABLE II

| SAMPLE | 1 | 2 | 3 | 4 | 5 | 6 | 7 | 8 | 9 | 10 |
|---|---|---|---|---|---|---|---|---|---|---|
| Styrene | — | 80 | — | — | — | — | — | — | — | — |
| l.d. polyethylene | — | — | — | 80 | — | — | — | — | — | — |
| EMA (2257) | 80 | — | — | — | — | — | — | — | — | — |
| EMA (2205) | — | — | 80 | — | — | — | 78 | — | 70 | 70 |
| EVA (UE 621) | — | — | — | — | 78 | — | — | — | — | — |
| EVA (UE 645) | — | — | — | — | — | — | — | 80 | — | — |
| Olefin resin (DuPont Surlyn) | — | — | — | — | — | 80 | — | — | — | — |
| CPE | 17.6 | 17.6 | 17.6 | 17.6 | 17.6 | 17.6 | 17.6 | 17.6 | 17.6 | 17.6 |
| Lead Sterate | 0.4 | 0.4 | 0.4 | 0.4 | 0.4 | 0.4 | 0.4 | 0.4 | 0.4 | 0.4 |
| Blowing Agent | 2 | 2 | 2 | 2 | 2 | 2 | 2 | 2 | 2 | 2 |

TABLE II-continued

| SAMPLE | 1 | 2 | 3 | 4 | 5 | 6 | 7 | 8 | 9 | 10 |
|---|---|---|---|---|---|---|---|---|---|---|
| (Celogen) Zinc oxide | — | — | — | — | 2 | — | 2 | — | — | — |
| Antimony trioxide | — | — | — | — | — | — | — | — | 5 | — |
| Aluminum trihydrate | — | — | — | — | — | — | — | — | — | 5 |
| Comments | Less expansion than Sample 3 | Stiff | excellent, smooth, uniform cells | Stiff | not as good as Sample 7 | some blow in extruder | good, uniform expansion | good, softer than Sample 7 | improved flame retardancy, good expansion | improved flame retardancy good expansion |

That which is claimed is:

1. An extruded chemically post-blown resilient non-crosslinked closed cell thermoplastic foam comprising a blend of chlorinated polyethylene and at least one other thermoplastic polymer selected from the group consisting of polyurethane, polyamide, styrenic and olefin resins, the amount of chlorinated polyethylene, by weight, being from 0.025 to 0.5 parts per part of said at least one thermoplastic polymer, and said foam having a substantially uniform size closed cell structure.

2. A foam according to claim 1 in the form of a sheet having opposed, substantially parallel outer surfaces, and wherein the outer surfaces include an integrally formed, substantially moisture impermeable skin.

3. A foam according to claim 1 additionally including a particulate inorganic filler material dispersed throughout the foam.

4. A foam according to claim 1 wherein said at least one other thermoplastic polymer is selected from the group consisting of styrenic and olefinic polymers.

5. A foam according to claim 1 wherein said at least one other thermoplastic polymer is an ethylene polymer.

6. A foam according to claim 5 wherein said ethylene polymer is a copolymer of ethylene with at least one ethylenically unsaturated monomer.

7. A foam according to claim 6 wherein said ethylenically unsaturated monomer is selected from the group consisting of vinyl acetate and methyl acrylate.

8. An extruded chemically post-blown resilient non-crosslinked closed cell thermoplastic foam comprised of a thermoplastic polymer component consisting essentially of a blend of chlorinated polyethylene and a copolymer of ethylene with methyl acrylate, the amount of chlorinated polyethylene, by weight, being from 0.025 to 0.5 parts per part of said ethylene copolymer, and said foam having a substantially uniform size closed cell structure.

9. An extruded chemically post-blown resilient non-crosslinked closed cell thermoplastic foam comprised of a thermoplastic polymer component consisting essentially of a blend of chlorinated polyethylene and a copolymer of ethylene with vinyl acetate, the amount of chlorinated polyethylene, by weight, being from 0.025 to 0.5 parts per part of said ethylene copolymer, and said foam having a substantially uniform size closed cell structure.

10. A foam backed carpet article comprising a carpet layer including a backing and pile yarns secured to said backing and extending from one side thereof to form a pile surface, and a resilient foam underlay secured to the opposite side of said backing, said foam underlay comprising an extruded chemically post-blown resilient non-crosslinked closed cell thermoplastic foam comprising a blend of chlorinated polyethylene and at least one other thermoplastic polymer, the amount of chlorinated polyethylene, by weight, being from 0.025 to 0.5 parts per part of said ethylene copolymer, and said foam having a substantially uniform size closed cell structure.

* * * * *